O. C. REISTE.
SPRING WHEEL.
APPLICATION FILED JULY 30, 1914.
1,143,435.
Patented June 15, 1915.
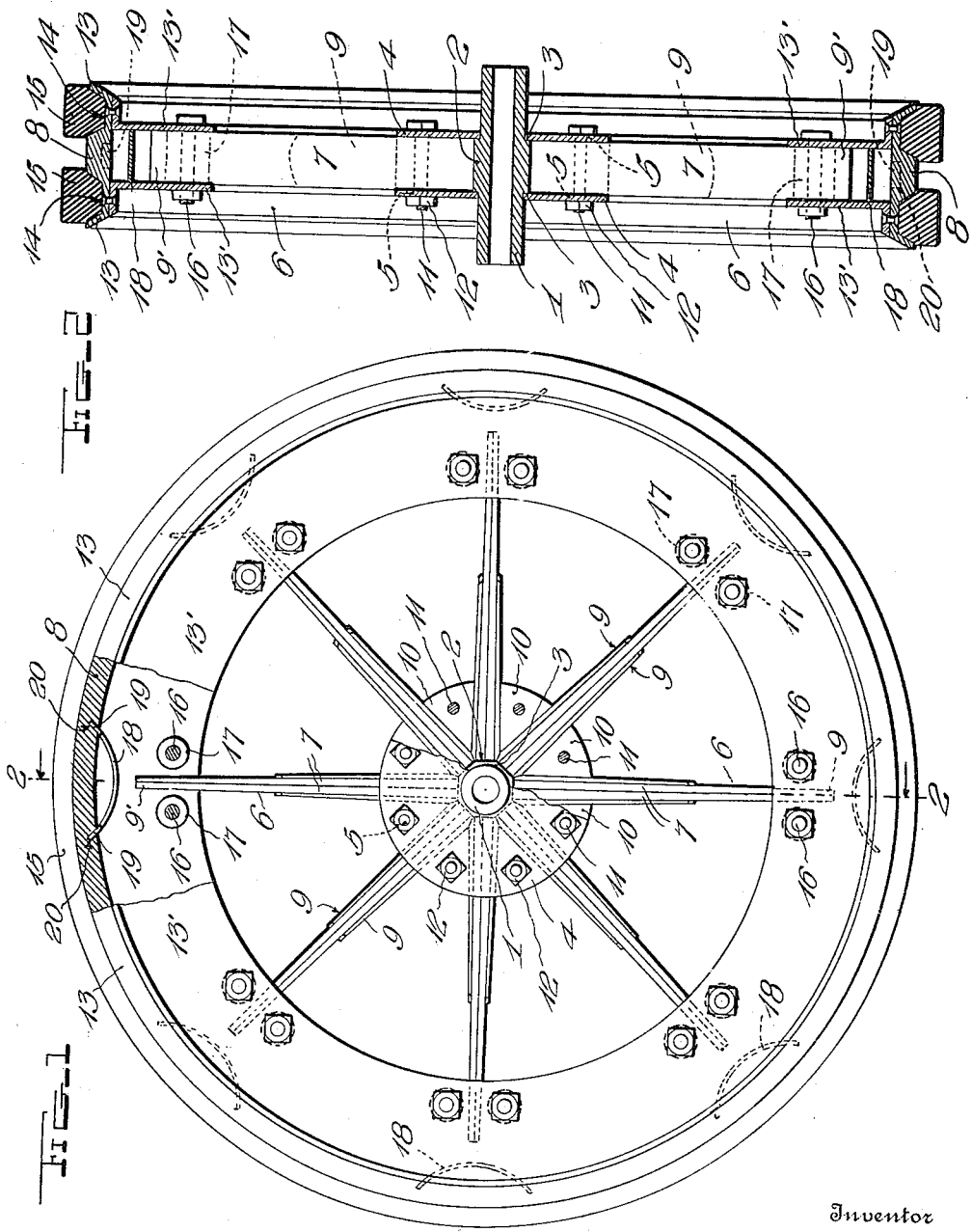
Witnesses
Inventor
O. C. Reiste
By H. B. Willson & Co.
Attorneys

UNITED STATES PATENT OFFICE.

OLIVER C. REISTE, OF MOUNT PLEASANT, IOWA.

SPRING-WHEEL.

1,143,435.  Specification of Letters Patent.  Patented June 15, 1915.

Application filed July 30, 1914. Serial No. 854,072.

*To all whom it may concern:*

Be it known that I, OLIVER C. REISTE, a citizen of the United States, residing at Mount Pleasant, in the county of Henry and State of Iowa, have invented certain new and useful Improvements in Spring-Wheels; and I do declare the following to be a full, clear, and exact description of the invention, such as will enable others skilled in the art to which it appertains to make and use the same.

My invention relates to vehicle wheels and more especially to that class of the same which are in themselves resilient and therefore do not necessitate the use of pneumatic tires.

One object of my invention is to provide a resilient wheel of this character in which the spokes thereof are permitted to have a free longitudinal movement so that the wheel will readily yield under jars and consequently give all the advantages of the pneumatic tire, without its accompanying disadvantages.

Another object of the same is to provide a simple means to limit the longitudinal movement of said spokes.

A further object of my invention is to construct the spokes in such a manner as to make the outer portion thereof more resilient than that of the inner.

With these and other objects in view my invention consists of certain details of construction and combination and arrangement of parts which will be more fully pointed out and claimed.

In the accompanying drawings in which similar parts are designated by corresponding numerals: Figure 1 is a side elevation of my improved wheel; the latter being shown partly in section; and Fig. 2 is a transverse vertical section thereof taken on the line 2—2 of Fig. 1.

My invention in its present embodiment comprises a hub 1 having a central octagonal shaped enlargement 2, forming oppositely disposed annular shoulders 3.

Plates 4 are mounted upon the hub 1, and are suitably spaced by the shoulder 3 against which they bear. The plates 4 are provided with an annular series of apertures 5, the purpose of which will be hereinafter referred to.

Radially projecting from the hub 1 are a plurality of resilient spokes 6, the latter being formed in four parts and consisting of the inner gradually tapering leaf springs 7 contiguously disposed and extending radially from the hub 1 to within a short distance of the rim 8; and the outer gradually tapering supplemental or reinforcing leaf springs 9, which are situated on opposite sides of the springs 7 and extend from the hub 1 to a point slightly beyond the center of said plates 7, as clearly shown in Fig. 1. By tapering the springs 7 and 9 as set forth, the spokes 6 will have a gradually increasing resiliency from one extremity to the other, while the extreme outer portion 9' of the spokes not having reinforcing means is highly resilient and will readily yield under the slightest pressure.

In order to maintain the spokes 6 in their proper spaced relation V-shaped blocks 10 are placed between the plates 3 and interposed between the spokes. These blocks are held in their adjusted position by the transversely disposed bolts 11 extending therethrough and through openings 5 in said plates 3. Said bolts being held in position by the nuts 12 threaded on one end thereof.

The rim 8 of my improved wheel is provided with the usual tire channels 14 to receive a suitable solid tire 15. Riveted to and projecting inwardly from the lower surface of the rim 8 are the two suitably spaced flanges 13' which are right angular in cross sectional area and co-act with the rim 8 to form an annular compartment which receives the outer portion of the spokes 6 as will be hereinafter described.

Arranged between the plates 13' and mounted upon the transversely extending bolts 16 are the antifriction rollers 17, said rollers being disposed in pairs which latter are arranged in spaced relation around the annular compartment formed by said flanges. The rollers of each pair are sufficiently spaced to admit the outer portion 9' of each of the spokes 6 and permit the same to have a free rectilinear movement between said rollers, as will be readily understood by reference to Fig. 1 of the drawings.

However, as it may sometimes be necessary to limit the longitudinal movement of the spokes 6 in order to prevent any damage to the rim, as under an extraordinary jar, the outer portion of the spoke 6 might be violently brought against the inner surface of the rim, with the result that the latter would perhaps split, or be seriously damaged, so therefore, to avoid this possibility, I provide the convexly bowed leaf springs 18. To maintain the springs 18 in a properly bowed position, they are formed with the outwardly projecting tongues 19, which latter fit into the suitably spaced sockets or seats 20 formed in the inner surface of the rim 8.

In the operation of my improved wheel if a weight is applied to the hub 1, the latter will move downwardly causing the outer portion of the spokes 6 which are directly above and below the hub to be moved between the rollers 17 until checked by the bowed spring 18. Consequently, until said spokes contact with the aforementioned bowed spring, there is practically no resistance to the downward movement of the hub. This downward movement will be checked, however, by the horizontally disposed spokes which, owing to their disposition with respect to the vertically disposed spokes will exercise a counteracting influence upon the longitudinal movement of the latter.

Therefore, from the foregoing, it will be seen that I have provided a wheel which is simple, easily constructed and one which, although using a solid tire, nevertheless, gives all the advantages derived from the utilization of the pneumatic tire.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

I claim as my invention:

A wheel of the character specified comprising a hub, a plurality of spokes projecting radially therefrom comprising inner and outer resilient plates, the former having a gradual taper from the inner to the outer extremities thereof, the latter having their outer extremities terminating at a point on said inner plates spaced from the outer extremities thereof whereby to augment the resiliency of said spokes, a rim, flanges secured in spaced relation to the inner surface of said rim and projecting inwardly therefrom whereby to envelop the outer portion of said spokes, a pair of anti-friction rollers transversely disposed between said flanges opposite the free ends of each of said spokes, said rollers being spaced circumferentially to receive the tapered portion of the latter whereby to permit longitudinal movement on the part of the same, and means disposed on the under surface of said rim contiguous to the outer extremity of said spokes whereby to counteract the movement of the latter substantially as and for the purpose set forth.

In testimony whereof I have hereunto set my hand in presence of two subscribing witnesses.

OLIVER C. REISTE.

Witnesses:
EARL HUENE,
J. O. BROWN.

Copies of this patent may be obtained for five cents each, by addressing the "Commissioner of Patents, Washington, D. C."